E. W. KIMBALL.
Hand-Seeder.
No. 21,137. Patented Aug. 10, 1858.
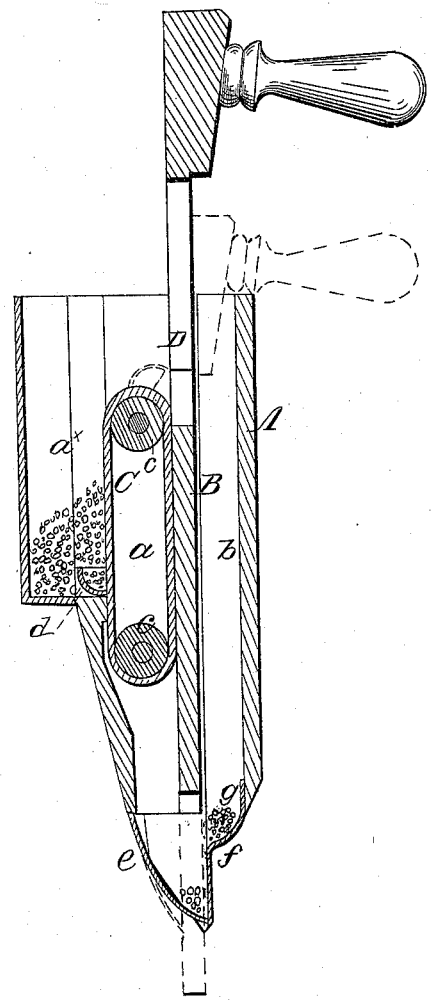

UNITED STATES PATENT OFFICE.

E. W. KIMBALL, OF OTTAWA, ILLINOIS.

IMPROVEMENT IN SEED-PLANTERS.

Specification forming part of Letters Patent No. 21,137, dated August 10, 1858.

*To all whom it may concern:*

Be it known that I, E. W. KIMBALL, of Ottawa, in the county of La Salle and State of Illinois, have invented a new and Improved Hand Seed-Planting Device; and I do hereby declare that the following is a full, clear, and exact description of the same, reference being had to the annexed drawing, making a part of this specification, said drawing being a vertical central section of my invention.

The object of this invention is to obtain, by the employment or use of a very few parts judicially arranged, an efficient hand seed-planter, one that may be readily manipulated, economically constructed, and not liable to get out of order.

The invention consists in placing a reciprocating hand-slide within a proper case and having an endless band provided with a seed-cup attached thereto, the slide dividing the case into two equal parts and having an opening made in it to allow the seed to pass through, the above parts being used in connection with a spring-plate and rest-plate or guide, and the whole arranged as hereinafter fully shown and described.

To enable those skilled in the art to fully understand and construct my invention, I will proceed to describe it.

A represents the box or case of the implement, and B is a slide which is fitted longitudinally therein in grooves or between proper guides, and allowed to slide freely up and down, the upper end of the slide being provided with a handle by which it may be operated. The slide B divides the box or case A into two parts, $a\ b$, a portion of $a$ being the seed box or hopper, $a^\times$, which may be of sheet metal. The other portions may be of wood. In the part $a$ of the box or case two rollers, $c\ c$, are placed one over the other in the same plane, and an endless band, C, is placed on the rollers $c\ c$. To the band C a seed-cup, $d$, is attached, and the band C is attached to the slide B. Through the slide B a hole or opening, D, is made. The lower end of the box or case A is formed of two metal plates, $e\ f$. One plate, $e$, is an elastic or yielding plate. The other is rigid, and is so curved as to form a shoulder or shelf, as shown at $g$. The plate $e$ is curved so that when not acted upon by the slide it will press against the lower end of $f$ and close the end of the box or case.

The operation is as follows: The corn or other seed to be planted is placed within the seed box or hopper $a^\times$, and the operator in first using the implement draws up the slide B, and thereby operates the band C, the seed-cup $d$ passing down to the bottom of the hopper $a^\times$. The slide B is then shoved down, and the band C will be moved in the opposite direction, the seed-cup $d$, which is filled with seed, rising and passing over the top of the upper roller, $c$, and discharging its contents into $b$, the seed falling on the shelf $g$, as shown in red, and there retained by the slide B. The slide B is then drawn upward. The seed on $g$ then falls to the bottom of the box or case, as shown in black, and the implement is ready for immediate use. In using the implement the lower end of the box or case is placed on or over the desired spot, the slide B forced down, and the seed at the lower part of the box or case forced into the earth by the slide B, a cup full of seed for a succeeding hill being discharged through opening D into $b$ every time a hill is planted, and the plate $e$ returning to its original position to close the bottom of the case A every time the slide D is raised.

This is a very simple implement, and it may be made at a small cost and manipulated by any person, even if possessed of no mechanical ingenuity.

Having thus described my invention, what I claim as new, and desire to secure by Letters Patent, is—

The slide B, placed within the box or case A, perforated at D, and provided with the endless band C, with seed-cup $d$ attached, in connection with the elastic or yielding plate $e$, and rest-plate or guide $f$, placed at the lower end of the box or case, it being understood that I do not claim separately any of the parts, but the whole combined and arranged as and for the purpose set forth.

E. W. KIMBALL.

Witnesses:
CHAS. C. CAMPBELL,
M. A. CUSHING.